United States Patent

Winklhofer et al.

(10) Patent No.: US 7,930,934 B2
(45) Date of Patent: Apr. 26, 2011

(54) MEASURING DEVICE

(75) Inventors: Ernst Winklhofer, St. Johann ob Hohenburg (AT); Alexander Friedl, Graz (AT)

(73) Assignee: AVL List GmbH, Graz (AT)

( * ) Notice: Subject to any disclaimer, the term of this patent is extended or adjusted under 35 U.S.C. 154(b) by 104 days.

(21) Appl. No.: 12/457,007

(22) Filed: May 28, 2009

(65) Prior Publication Data

US 2009/0301178 A1 Dec. 10, 2009

(30) Foreign Application Priority Data

Jun. 6, 2008 (AT) .................................. A 922/2008

(51) Int. Cl.
*G01M 15/08* (2006.01)
(52) U.S. Cl. .................................................. 73/114.79
(58) Field of Classification Search ............... 73/114.19
See application file for complete search history.

(56) References Cited

U.S. PATENT DOCUMENTS

| | | | |
|---|---|---|---|
| 4,061,035 A | 12/1977 | Witzke et al. | |
| 4,419,212 A * | 12/1983 | Dietz et al. | 204/424 |
| 4,452,672 A | 6/1984 | Parker et al. | |
| 4,620,093 A * | 10/1986 | Barkhoudarian et al. | 250/231.19 |
| 5,706,372 A * | 1/1998 | Viduya | 385/12 |
| 5,714,680 A * | 2/1998 | Taylor et al. | 73/37 |
| 5,726,351 A | 3/1998 | Glaser | |
| 6,094,990 A * | 8/2000 | Lykowski et al. | 73/714 |
| 6,122,971 A * | 9/2000 | Wlodarczyk | 73/705 |
| 6,131,465 A * | 10/2000 | Wlodarczyk et al. | 73/715 |
| 6,539,136 B1 | 3/2003 | Dianov et al. | |
| 6,622,549 B1 * | 9/2003 | Wlodarczyk et al. | 73/114.51 |
| 6,649,924 B1 | 11/2003 | Philipp et al. | |
| 6,820,488 B2 * | 11/2004 | Lenzing et al. | 73/705 |
| 6,823,738 B1 * | 11/2004 | Wlodarczyk et al. | 73/705 |
| 7,022,968 B1 * | 4/2006 | Hopper et al. | 250/215 |
| 7,340,118 B2 * | 3/2008 | Wlodarczyk et al. | 385/12 |
| 7,628,137 B1 * | 12/2009 | McAlister | 123/297 |
| 2008/0211373 A1 | 9/2008 | Karst et al. | |
| 2008/0218052 A1 * | 9/2008 | Winklhofer | 313/118 |
| 2010/0183993 A1 * | 7/2010 | McAlister | 431/254 |

FOREIGN PATENT DOCUMENTS

| | | |
|---|---|---|
| AT | 002228 | 6/1995 |
| AT | 002114 | 4/1998 |
| DE | 1900970 | 9/1969 |
| DE | 3001711 | 7/1981 |
| DE | 8614081 | 11/1987 |
| DE | 3912177 | 10/1990 |
| GB | 752851 | 7/1956 |

OTHER PUBLICATIONS

English Abstract of DE1900970.
English Abstract of AT00228.
English Abstract of AT002114.

* cited by examiner

*Primary Examiner* — Freddie Kirkland, III
(74) *Attorney, Agent, or Firm* — Dykema Gossett PLLC

(57) ABSTRACT

The invention relates to a measuring device (1) for detecting processes in the combustion chamber of an internal combustion engine, comprising a pressure sensor (3) which is arranged to be inserted into a bore hole of the internal combustion engine which opens into a combustion chamber, with the pressure sensor (3) comprising at least one optical light guide (6) optically opening into the combustion chamber, and with an optical injection element (8) being arranged preferably in the opening region into the combustion chamber. In order to enable performing simultaneously a pressure measurement and optical combustion chamber monitoring at the same place of the combustion chamber, it is provided that the optical injection element (8) is soldered into a pressure membrane (5) of the pressure sensor (3) or into the housing (2) of the pressure sensor (3).

6 Claims, 1 Drawing Sheet

MEASURING DEVICE

BACKGROUND OF THE INVENTION

1. Field of the Invention

The invention relates to a measuring device for detecting processes in the combustion chamber of an internal combustion engine, comprising a pressure sensor which is arranged to be inserted into a bore hole of the internal combustion engine which optically opens into a combustion chamber, with the pressure sensor comprising at least one optical light guide opening into the combustion chamber, and with an optical injection element being arranged preferably in the opening region into the combustion chamber.

2. The Prior Art

A simultaneous optical measurement and pressure measurement is absolutely essential especially for monitoring combustion processes in the combustion chamber in order to enable monitoring the combustion processes in real time. As a result of the compact arrangement of the gas-exchange valves, the injection devices and the spark plugs, it is becoming increasingly difficult to provide additional bore holes in the cylinder head for the optical monitoring of the combustion chamber and the pressure monitoring of the combustion chamber. That is why it is desirable to keep the number of measuring bores as low as possible. One possibility to avoid these additional bores is adapting an additional measuring function in a spark plug.

A spark plug with an integrated pressure measuring device and an optical measuring device is known from AT 503.067 A1. The housing of the spark plug comprises a first bore hole for receiving the pressure measuring device and a second bore for receiving a light guide opening into the combustion chamber.

A spark plug is known which comprises a continuous longitudinal bore arranged off-center in the housing for receiving an isolator. The spark plug comprises housing regions of different wall thickness, with a pressure measuring device being arranged in a region of larger wall thickness. The bore hole for accommodating the pressure measuring device is arranged to be inclined with respect to the longitudinal bore hole.

A spark plug for internal combustion engines is known from AT 002.228 U1 which comprises an optical sensor which is integrated in the spark plug and comprises several light guides opening into the combustion chamber. The light guides are arranged concentrically about the central electrode. A group each of bores extending parallel to the axis of the spark plug opens into a collective bore arranged as a pocket hole. The optical connection is produced via light guide cables and the light guides opening into the combustion chamber via the collective bore and the bore holes.

AT 003.845 U1 describes an optoelectronic measuring device for detecting combustion processes in the combustion chamber of an internal combustion engine which is in operation, with optical sensors being arranged in a substantially cylindrical component opening into the combustion chamber and the sensor ends being arranged radially in the jacket of the component. The component can be a spark plug for example.

From AT 402.116 B a spark plug is further known which comprises a force-measuring element for measuring the pressure applied to the spark plug, with the insulating body of the spark plug resting on the plug housing under pressurization in the axial direction by interposing the force-measuring element. Further spark plugs with optical sensors are known from the publications WO 2006/037251 A1, U.S. Pat. No. 4,452,672 A, DE 86 14 081 U1 and DE 30 01 711 A1. DE 10 2005 060 139 A1 describes a spark plug with integrated pressure sensor.

Spark plugs with integrated optical and pressure sensors are expensive special productions. Such spark plugs are not suitable for series-produced engines because the spark plug, as a component subject to wear and tear, should be capable of exchange, irrespective of optical sensors and pressure sensors. Moreover, it is desirable to perform a simultaneous optical measurement and pressure measurement even in the case of internal combustion engines without spark plugs.

Temperature-insensitive pressure sensors of small size are usually used for pressure measurement, e.g. piezoelectric or piezoresistive pressure sensors, with the pressure sensor being inserted into the cylinder head in bore holes of small diameter. The very small bore holes of 5 mm for example for receiving pressure sensors formed an obstacle up until now for combinations with optical sensors.

Piezoelectric pressure sensors for measuring the pressure in the combustion chamber in internal combustion engines are known for example from the publications GB 752 851 A, DE 25 44 505 A1, DE 19 00 970 A1 or DE 39 12 177 A1. A fiber-optical pressure sensor is disclosed by EP 10 89 062 A1. A visual inspection of processes in the combustion chamber is not possible due to lack of a light guide opening into the combustion chamber.

AT 002 114 U1 shows an internal combustion engine with light guides arranged in the cylinder head gasket for monitoring the combustion chamber.

It is the object of the invention to provide a measuring device which enables in an internal combustion engine a simultaneous optical and pressure measurement in the smallest space which is independent of the spark plug.

SUMMARY OF THE INVENTION

This is achieved in accordance with the invention in such a way that the optical injection element is soldered into a pressure membrane of the pressure sensor or in the housing of the pressure sensor.

It is provided in a preferred embodiment of the invention that the optical injection element is spaced from the light guide. The distance between the light guide and the optical injection element enables an unhindered movement of the pressure membrane. Since the optical injection element is arranged in the pressure membrane, the measuring device can be arranged with an extremely small mounting diameter, so that it can be inserted into conventional pressure bores.

When the optical injection element is soldered into the housing of the pressure sensor, the light guide is guided in a drilled optical duct to a lateral housing region, with the optical duct opening into the combustion chamber next to the pressure membrane.

The optical injection element can be arranged as an optical lens or as a prism. It is further possible to arrange the surface of the optical injection element on the side of the combustion chamber with several surface elements which are formed to be planar and/or curved.

The measuring device is in no way limited to a certain measuring principle. It is therefore provided within the scope of the invention that the pressure sensor can be arranged as a piezoelectric, piezoresistive, frequency-analog, capacitive, inductive or optical pressure sensor, or as a pressure sensor with a Hall element.

The invention is now explained in greater detail by reference to the drawings.

DETAILED DESCRIPTION OF THE PREFERRED EMBODIMENTS

Figure 1:
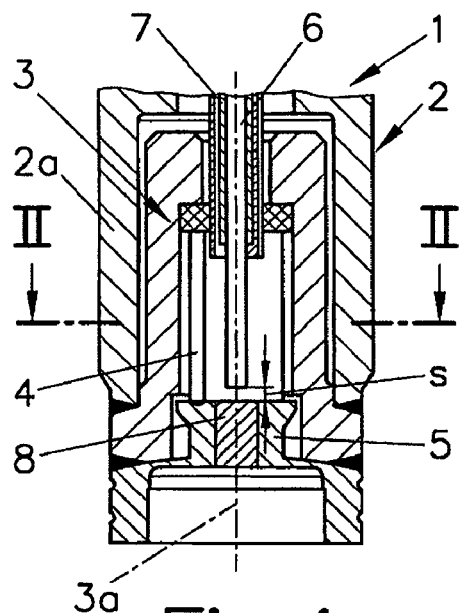
FIG. 1 shows a longitudinal sectional view of a measuring device in accordance with the invention in a first embodiment.

FIG. 1 shows a measuring device 1 with a pressure sensor 3 which is arranged within the housing 2 of the measuring device 1. In the embodiment, the pressure sensor 3 is formed by a piezoelectric pressure sensor, with the piezo-electric elements being designated with reference numeral 4. The pressure sensor 3 comprises a pressure membrane 5 which is in contact with the piezo-electric elements 4, with the piezo-electric elements 4 being subjected to an axial force via the pressure membrane 5 adjacent to the combustion chamber (not shown in greater detail).

Figure 2:
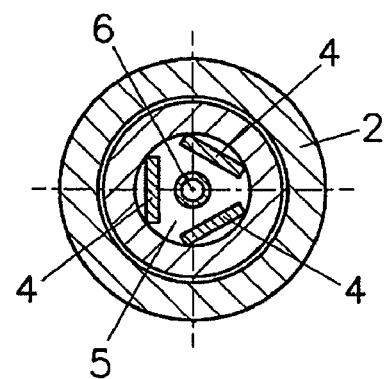
FIG. 2 shows the measuring device in a sectional view along line II-II in FIG. 1.

The pressure sensor 3 comprises a centrally arranged light guide 6 in the embodiment as shown in FIGS. 1 and 2, which light guide is partly enclosed by a protective capillary 7. An optical injection element 8 is soldered into the pressure membrane 5 in order to enable an optical connection of the light guide 6 with the combustion chamber. An air gap s is provided between the light guide 6 and the optical injection element 8 in order to enable free floating of the pressure membrane 5 in relation to the light guide 6.

Figure 3:
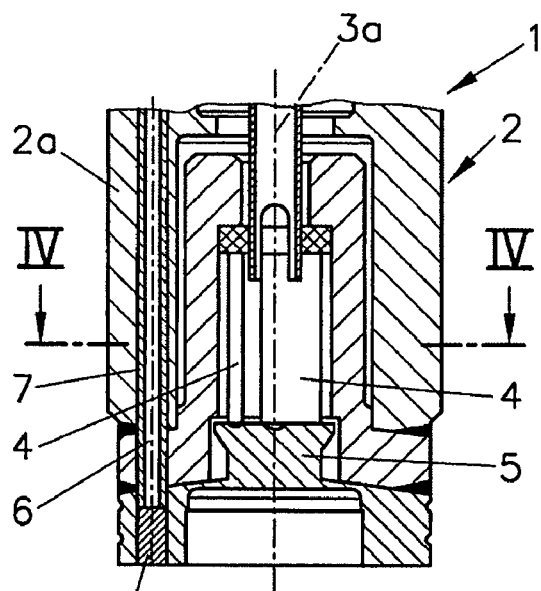
FIG. 3 shows a longitudinal sectional view of the measuring device in accordance with the invention in a second embodiment.
Figure 4:
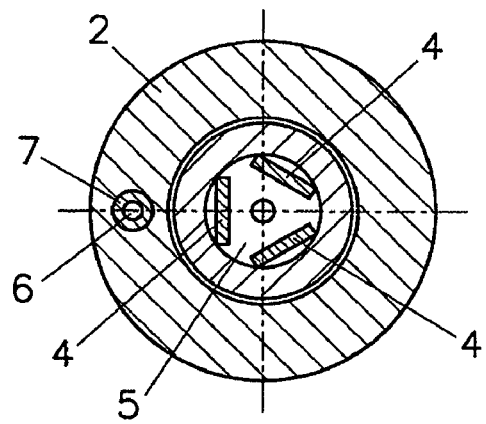
FIG. 4 shows the measuring device of FIG. 3 in a sectional view along line IV-IV in FIG. 3.

FIGS. 3 and 4 show a further embodiment of the invention, with the light guide 6 being embedded and soldered into the housing wall 2a of the housing 2 and is thus spaced from the axis 3a of the pressure sensor 3. An optical injection element 8 is soldered together with the housing 2 and the membrane 5 in the end region of the light guide 6 in the area of the pressure membrane 5, with the optical injection element 8 optically connecting the light guide 6 with the combustion chamber. The embodiment according to FIGS. 3 and 4 can be used especially in the case of larger bore hole diameters for receiving the measuring device 1.

The optical injection element 8 can be formed by an optical lens or a prism. It is further also possible to arrange the surface of the optical injection element 8 on the side of the combustion chamber with several planar and/or curved surface elements.

The invention claimed is:

1. A measuring device for detecting processes in a combustion chamber of an internal combustion engine, comprising a pressure sensor which is arranged to be inserted into a bore hole of the internal combustion engine which opens into the combustion chamber, the pressure sensor comprising at least one optical light guide optically opening into the combustion chamber, and an optical injection element arranged in an opening region into the combustion chamber, wherein the optical injection element is soldered into a pressure membrane of the pressure sensor or into a housing of the pressure sensor.

2. The measuring device according to claim 1, wherein the optical injection element is axially spaced from the light guide.

3. The measuring device according to claim 1, wherein the optical injection element is a lens.

4. The measuring device according to claim 1, wherein the optical injection element is a prism.

5. The measuring device according to claim 1, wherein a surface of the optical injection element on a combustion side comprises several planar and/or curved surface elements.

6. The measuring device according to claim 1, wherein the pressure sensor is a sensor selected from the group of piezoelectric, piezoresistive, frequency-analog, capacitive, inductive or optical pressure sensor, or as a pressure sensor with a Hall element.

* * * * *